US005198799A

United States Patent [19]

Pascale

[11] Patent Number: 5,198,799

[45] Date of Patent: Mar. 30, 1993

[54] OPTO-ELECTRONIC SECURITY FENCE

[75] Inventor: Danny Pascale, Montreal, Canada

[73] Assignee: Allied-Signal Inc., Morris Township, Morris County, N.J.

[21] Appl. No.: 766,500

[22] Filed: Sep. 26, 1991

[51] Int. Cl.[5] .......................... G08B 13/18; H04B 1/38

[52] U.S. Cl. .................................... 340/552; 250/221; 340/502; 340/556; 340/693; 455/90

[58] Field of Search ......................... 340/552, 555-557, 340/693, 505, 825.54, 524, 541, 825.05, 825.49, 502, 504; 342/27; 367/93; 250/221; 455/88, 90

[56] References Cited

U.S. PATENT DOCUMENTS

| | | | |
|---|---|---|---|
| 3,711,846 | 1/1973 | Schlisser et al. | 340/557 |
| 3,825,916 | 7/1974 | Steele et al. | 340/557 |
| 4,978,942 | 12/1990 | Bruce | 340/556 |

*Primary Examiner*—Thomas Mullen

*Attorney, Agent, or Firm*—Howard G. Massung

[57] ABSTRACT

A surveillance fence comprising at least two posts (10) each equipped with electro-magnetic radiation transmitters (12) and receivers (14) which establish two parallel communications links. Each posts (10) communicate with a surveillance computer at a headquarters (20). Only one post (10) communicates directly via cables with headquarters (20). Data is transmitted over the communication links in opposite directions by modulating the electromagnetic energy beams. A message starts at headquarters (20) and is passed along post (10) to post (10) and back again to headquarters (20). Each post (10) can add information to the message as it is passed along. The interruption of the electromagnetic energy beams signals an intrusion whose location and time of occurence is recorded by a processor (16) which initiates an alarm. If a post (10) can not relay its intrusion data, the data is stored until the communications link is reestablished. The intrusion data stored at a post (10) will not be erased until an acknowledge message is received from headquarters (20).

4 Claims, 4 Drawing Sheets

OPTO-ELECTRONIC SECURITY FENCE

DESCRIPTION OF THE PRIOR ART

Field of the Invention

This invention relates to an intruder detection security system.

Background of the Invention

Security systems are known which include a security fence installed along a perimeter or boundry which is to be guarded against intrusion and/or escape. Fencing is frequently used to surround areas which are desired to be kept secure. Since the secure area may be very large and the fence correspondingly long, it is frequently difficult to physically patrol or monitor the entire length. Thus it is desirable to provide an apparatus for automatically providing an alarm indication at a central location when an intruder has entered the fenced area and to further provide an indication of the location of the intrusion so that personnel may be dispensed to the appropriate location.

Security fences of various type are known in the prior art and available on the market. These include taut wire fence systems which employ tension wires mounted onto motion sensors whereby an attempt to cut or spread apart the wire results in an alarm indication of the approximate location of the attempted intrusion.

There are also known a variety of security barriers which employ a fiber optic sensing apparatus. Exemplary of such systems is a security barrier structure comprising a lattice of hollow tubular members through which fiber optic cable is threaded. An attempt to break through the barrier breaks or distorts the fiber by over tensioning thus causing a sensible attenuation of an optical signal transmitted through the cable.

The following U.S. patents are exemplary of prior art security detection and location systems; U.S. Pat. Nos. 4,399,430; 4,450,434; 4,558,308; 4,676,485; 4,680,573; and 4,777,476.

SUMMARY OF THE INVENTION

The present invention teaches a surveilance fence defined by beams of light or other electromagnetic radiation wherein each section of the fence comprises two posts equipped with transmitters and receivers which establish two parallel communication links. Data is transmitted over these communication links in opposite directions and the interruption of a beam signals an intrusion whose location and time of occurence can be recorded by a signal processor, such as a computer, which can initiate an alarm.

The opto-electronic fence of the present invention consists of identical posts placed in such a manner that they define a line or perimeter to be monitored. Each post has a minimum of two transmitters and two receivers for electromagnetic radiation such as infrared (IR) light. Data is superimposed on the IR light beam, which is transmitted between the post, by modulating its amplitude. The disclosed surveillance fence can then be considered a serial communication network. Each post has a different identification (ID) number. When an interruption is sensed by a post, the post adds this interruption information in the following message it sends. Intrusion information from the monitoring post which sensed the interruption cascades down to the surveillance headquarters. A message from only one post is sufficient to locate an intrusion. Only one post communicates directly with the surveillance computer, at the surveillance headquarters, normally over standard electrical cable.

Each post consists of transmitters, receivers, an electronic processor, a battery pack, a mounting post and a tripod support base. Posts are constructed for rapid deployment and removal. The disclosed intrusion detection system can monitor multiple alarm simultaneously, can operate continuously in a self check mode, and after detecting an intrusion, the disclosed surveillance fence can be automatically reactivated.

BRIEF DESCRIPTION OF THE DRAWINGS

For a better understanding of the invention, reference may be had to the preferred embodiments exemplary of the invention shown in the accompanying drawings in which.

DETAILED DESCRIPTION OF THE PREFERRED EMBODIMENT

Figure 1:
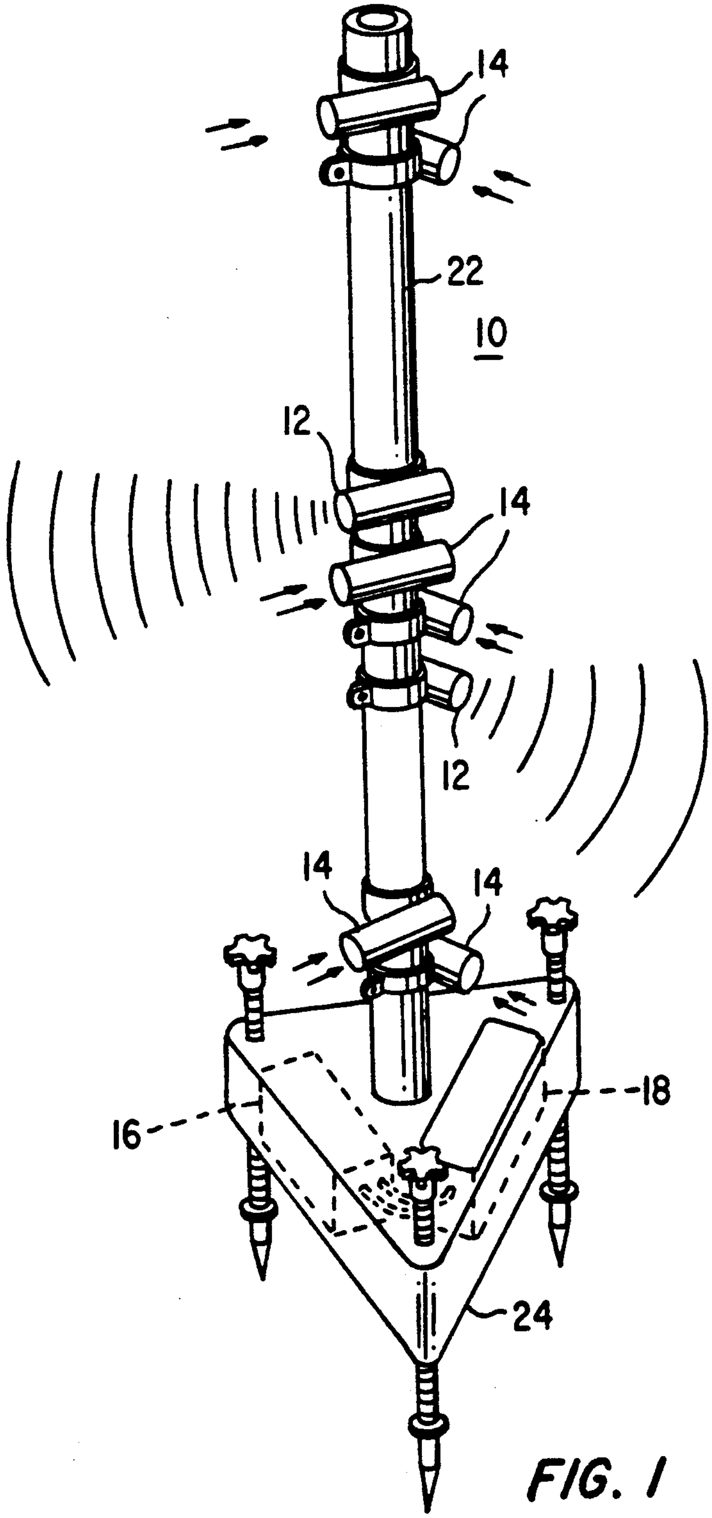
FIG. 1 shows a post for an opto-electronic surveillance fence according to the teaching of the present invention.
Figure 5:
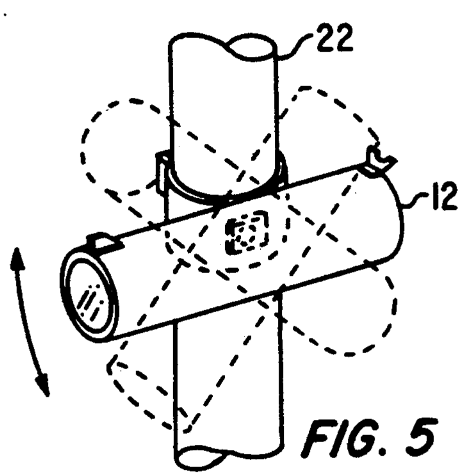
FIG. 5 is an enlarged view showing how a transmitter or receiver is adjustable attached to the post for up and down positioning; and, FIG. 6 is similar to FIG. 5 showing how a receiver or transmitters is adjustable attached to the post for side to side positioning.
Figure 6:
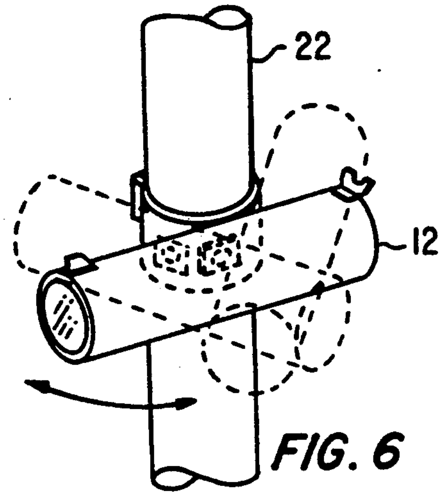

Referring now to the drawings and FIGS. 1, 5, and 6 in particular, there is shown a post 10 for an opto-electronic security fence according to the present invention. The opto-electronic fence consists of identical posts 10 placed in such a manner that they define a line or a perimeter. The maximum number of posts 10 is not limited to any particular value, although a number equal to $2^n$, where n is an integer greater than zero, makes the digital design aspect easier to handle. Distance between posts 10 is also variable; typically, a range of between 50 m and 1000 m between posts 10 is expected.

The security fence is defined by beams of electromagnetic energy transmitted in opposite directions from one post 10 to another post 10. Prefered wavelengths for these beams is in the low Infrared (IR) or millimeter wave region of the electro-magnetic spectrum. Each post 10 has a minimum of two transmitters 12 and two receivers 14. As illustrated in FIG. 1, in the preferred embodiment each post 10 has two transmitters 12 and six receivers 14. Three receivers 14 are pointed at the preceding post 10 and the other three at the following post 10. The receivers 14 are placed at different heights to increase the detection probability and add redundancy.

When an object or intruder passes between two posts 10, one or more line of sights between one or two transmitters 12, and one to six receivers 14 will trigger an alarm. A functional diagram for explaining operation in a boundary type installation is shown in FIGS. 2*a* thru 2*d*; where for simplicity, only two receivers 14 per post 10 are illustrated. In FIGS. 2*a* through 2*d* there is shown four posts 10 designated P1, P2, P3 and P4.

Figure 2A:
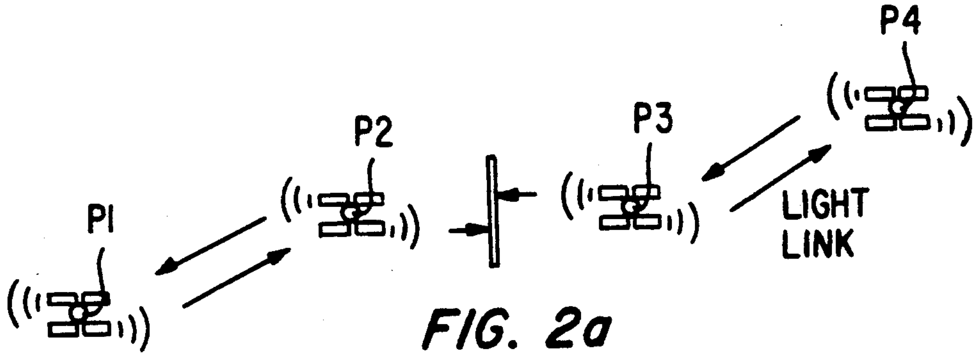
FIGS. 2*a* through 2*d* are illustrative block diagrams showing operation of the disclosed opto-electronic fence in a boundry type installation.
Figure 2B:
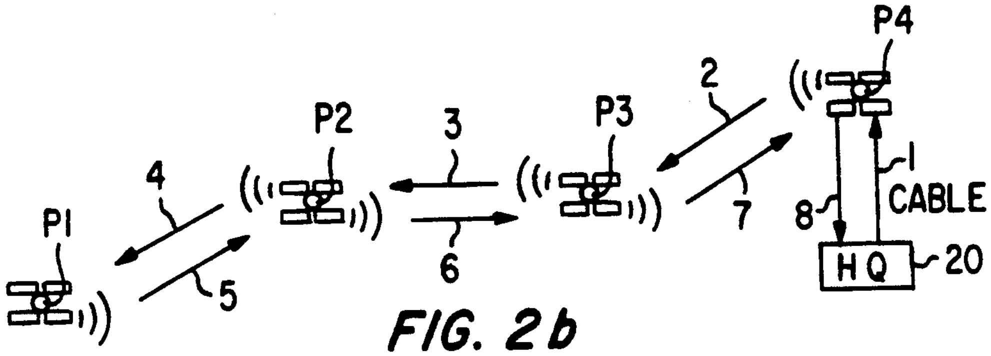

Since the detection of an alarm can take place in any post 10, some means of linking the posts 10 to a surveillance headquarters 20 is required. For communication the disclosed invention uses the inherent advantages of the electromagnetic beam going from one post to the other. Data is superimposed on the beam by modulating the beam in a manner well known in the art. The surveillance fence can then be considered a serial communication network. FIG. 2*b* shows how data issued by the surveillance headquarters 20 is sent along the fence from one post to the other, in a pass-the-bucket fashion. As FIG. 2*b* shows, the communication link starts with line 1 and serially goes around the fence communication link and back to headquarters 20 via line 8. Only one post 10, designated P4, communicates directly with the surveillance computer at the surveillance headquarter 20 over a standard electrical cable; any post 10 in the fence can be used to play this role. End posts 10 are identified during the installation procedure and these posts 10 will activate only one transmitter during normal operation.

Figure 2C:
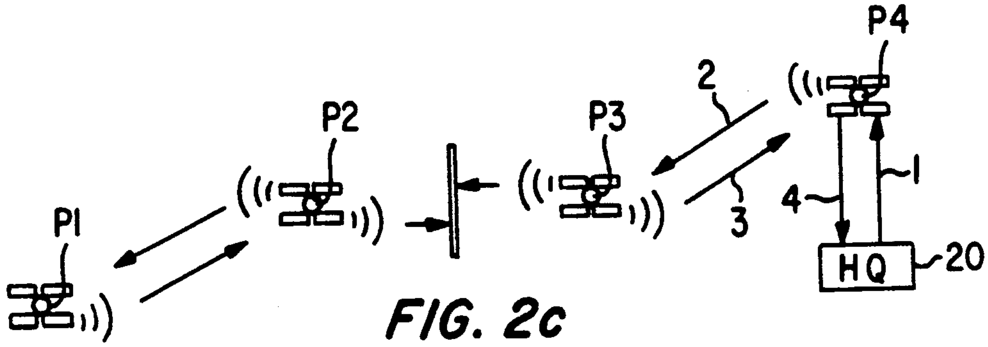
Figure 2D:
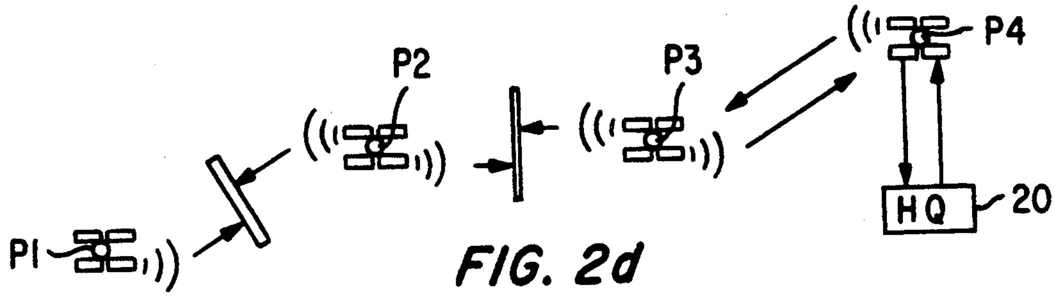

Each post 10 is assigned a different ID number. When an interruption is sensed by a post 10, the post 10 adds this interruption information in the following message it will send. The information consists of the post ID from which the signal was lost, the number of receivers 14 on the post 10 which sensed the loss, and the time. The information then cascades down to the surveillance headquarters as illustrated in FIG. 2*c*. Post 10, designated P3, senses the intrusion and transmits this information to the headquarters 20 via the post 10, designated P4. A message from only one post 10 is sufficient to locate the intrusion location. This is important since during a prolonged interruption one of the posts 10, such as P2 in FIG. 2*d*, may not be able to relay its data; in this case, the system is designed to store all interruption data in the isolated post 10 and send it when the communication link is reinstated. This feature is important to detect multiple interruptions between different posts as illustrated in FIG. 2*d*.

Operation of the fence in a perimeter type installation follows the same logic as described for a boundary type installation with the added advantages of the closed loop geometry which enable the immediate localization of simultaneous interruptions in two fence segments. In fact, in a perimeter type installation, only one transmitter 12 and one receiver 14 per post 10 could be used which would establish a single ring shaped communication link. However, since this, the preferred embodiment of this invention is based on the interruption of a mesh defined by a line of sight between a transmitter 12 and one or more receivers 14, the use of two contra-directional communication links provides a tighter mesh.

Each post 10 consists of the following elements: two transmitters 12; a minimum of two receivers 14; an electronic processor 16; a battery pack 18; a mounting post 22; and a tripod support base 24. The transmitter emits a diverging beam typically a 10 to 200 mrad cone, of electro-magnetic energy.

In the micro-wave region, a 10 to 60 GHz emitter can be used. The exact frequency will be chosen according to the amount of atmospheric attenuation that can be tolerated. In certain applications it may be an advantage to use a wavelength which is partially absorbed by the atmosphere since this will make the fence harder to detect at a distance.

Each IR transmitter 12 consists of either a high power LED or a laser diode whose output beam is shaped by an objective. A Fresnel lens can be used in such an application since imaging quality is not required; also, their high numerical aperture makes possible a compact system with large diameter output windows. This is a definite advantage for a surveillance system which must be eye safe. The biasing and analog driver circuits are located in the transmitter 12 casing; they are linked to the post processor 16 circuits via cables fitted with connectors. The transmitter unit 12 is field replaceable. The transmitter 12 case is a simple extruded and machined aluminum tube. As shown in FIG. 5, it is attached on a two degrees of freedom (rotational) mount on the mounting post 10. Each transmitter 12 can be individually aligned to the neighbouring posts without disturbing the other transmitter 12 and receivers 14. Mechanical sights are provided on the outside of transmitters 12 and receivers 14 to facilitate alignment.

Each optical receiver 14 consists of a lens and a PIN photodiode connected to a preamplifier. The PIN diode was chosen because of its efficiency in the low infrared, its high speed even for large area devices, and its low cost. The large area enables a larger field of view and eases the alignment tolerance. When compared to an avalanche photodiode, the PIN photodiode does not require a temperature compensation circuit and a high voltage biasing supply, which makes its cost advantage even greater. Similarly to the IR transmitter 12, the IR receivers 14 are linked to the processor 16 circuits via cables fitted with connectors, and they are field replaceable. If possible, the receiver 14 case will be identical to the transmitter 12 case. Each receiver 14 can be individually aligned to the neighbouring posts without disturbing the other transmitters and receivers.

In the microwave region a radar receiver, similar to the radar transmitter described above, could be used.

The opto-electronic fence considered in the following paragraphs has sixteen posts, each post has two transmitters 12 and six receivers 14. These characteristics, as well as the exact communication protocol, can be modified in different versions, however, the basic system principles will remain the same.

Figure 3:
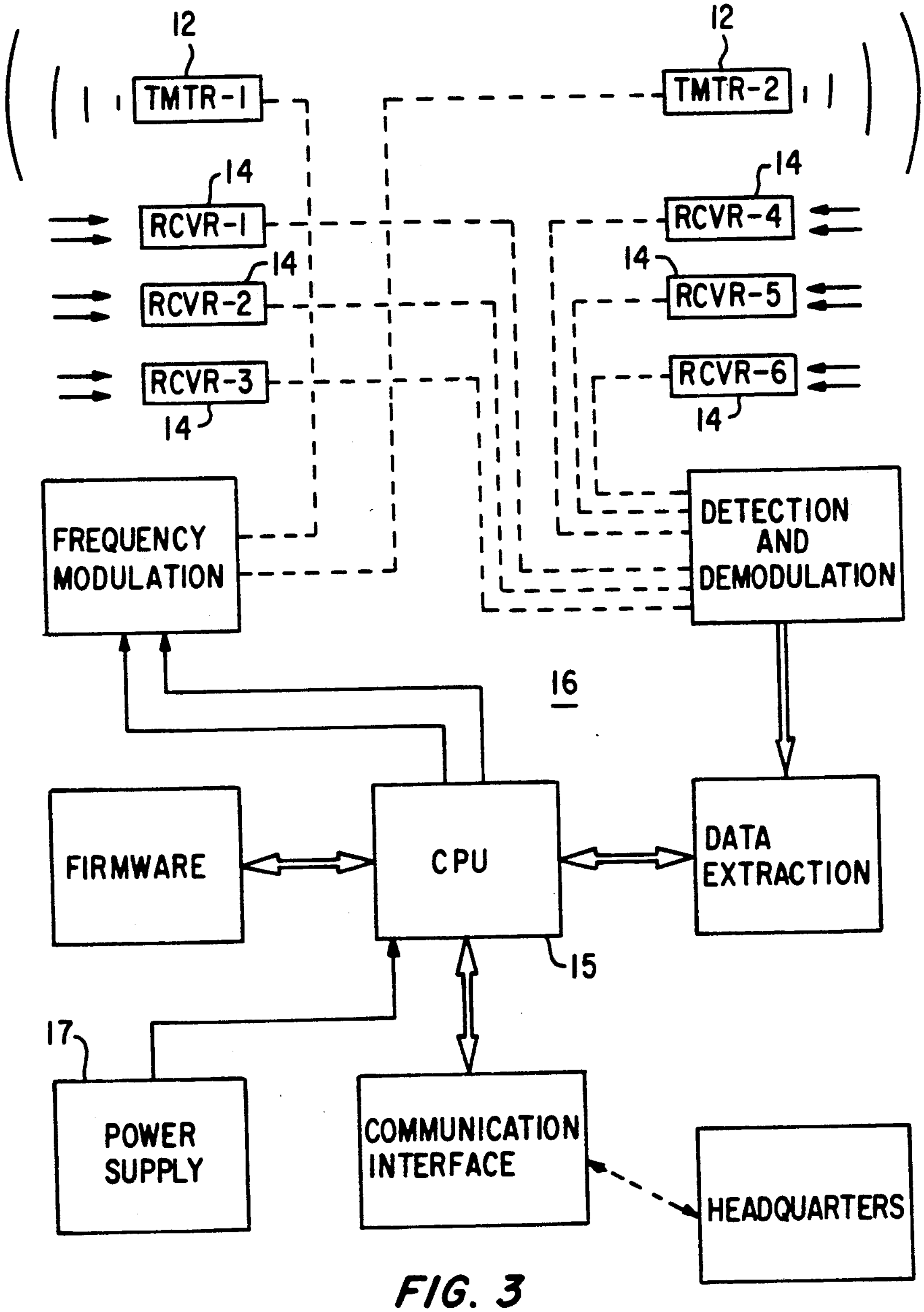
FIG. 3 is a block diagram schematic of the opto electronic fence post shown in FIG. 1.

An electronic schematic of a post 10 is shown in FIG. 3. Components which are not part of each post processor 16 are joined with dotted lines. Components and circuitry for constructing a suitable processor 16 are well known to those skilled in the art. The processor 16 contains the analog and digital circuitry required to: detect the presence of a modulated light beam, extract the data from the light beam signal, execute a command from the surveillance headquarter, generate a reply, and modulate a light source. Each post 10 has the hardware to communicate with a surveillance headquarter 20 via cable, however, only one post 10 is selected to play this role. Processor 16 includes a micro-controller CPU 15 and a power supply 17 which provides power from battery 18.

To prevent crosstalk between posts, each post 10 is assigned an ID which corresponds to a specific modulation carrier frequency. With reference to FIG. 2*b*, this ensures that the signal transmitted from a post 10, designated P1, to another post 10, designated P2, along line 5 in the drawing, will not be detected by the post 10, designated P3, which is to respond to the communication link along line 6. There is a detection and demodulation circuit assigned to each receiver 14, six per each post 10. An alarm is triggered when a beam is interrupted and one or more demodulation circuits do not detect a carrier frequency.

The micro-controller 15 is responsible for the interrupt analysis when an alarm is generated; a message, or a series of messages if there are multiple alarms, is composed. This message is added to the last valid digital data received from a neighbour post 10 and sent toward the surveillance headquarters 20. If the communication path between the surveillance headquarters and the post is blocked, as shown for the post 10, designated P2, in FIG. 2*c*, then the data will be kept in memory until the link is reactivated. In all cases, it is required that the surveillance headquarters 20 sends an acknowledge message to a post 10 from which it received an alarm. After reception of the acknowledge message, the post 10 will clear the intrusion event from its memory.

Figure 4A:
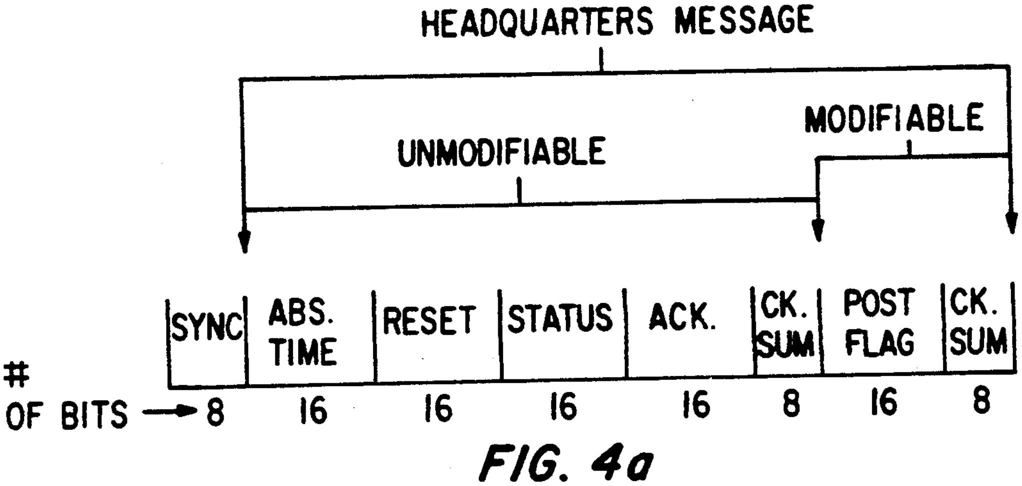
FIGS. 4*a* and 4*b* illustrate one of many possible data packet structures which can be transmitted along a sixteen post opto-electronic fence.
Figure 4B:
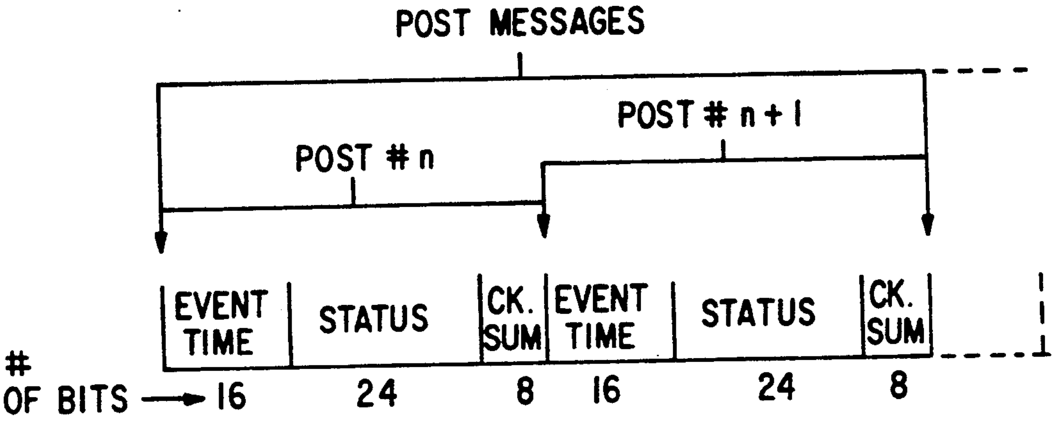

The data packet structure for a sixteen post fence is shown in FIGS. 4*a* and 4*b*. Since the link is asynchronous, a certain number of synchronization bits, eight for the purpose of discussion, is required at the start of the transmission. This is followed by a ninety six bit message issued by the surveillance headquarters 20, see FIG. 4*a*. This message is separated into two parts: the first part cannot be modified by any post; when received, it is relayed to the next post. The first part can be further separated into five blocks: the absolute time, sixteen reset bits, one per post; sixteen status bits, one per post; sixteen acknowledge bits, one per post; and an eight bit checksum. The second part, modifiable by any post, consist of a sixteen bit post flag, one per post; and an eight bit checksum for the flag. Once decoded by the surveillance headquarter 20, the flag indicates which post 10 has sent back an intrusion message.

A post message is forty eight bits long in three blocks, see FIG. 4*b*. The first block indicates the event time. The second block gives the post 10 status: receiver or receivers 14, which detected the alarm; start or end of the alarm condition for a given receiver; circuit fault; or low battery. The third block is an eight bit checksum for the post message. The post will also modify the post flag portion of the surveillance headquarter message and compute its new checksum. The revised post flag and the post message will then be added at the end of the surveillance headquarters 20 message and sent to the next post 10.

A data packet is sent from the surveillance headquarters 20 every second. In one second, the packet will be relayed to all the post, and then back to the surveillance headquarters 20. A post 10 retransmits the data only after it has received data, or after a predetermined timeout period. However, any interruption of a light beam will be detected even if there is no data transmission, because the ever present carrier beam will be interrupted. The registered interruption time resolution will be one second. The maximum number of bits in a message is eight hundred seventy two; eight SYNC bits, plus ninety six surveillance headquarters message bits, and sixteen times forty eight post message bits. Since there are thirty two relays per round trip and since each post can retransmit the message only after it has received it, the data rate must be high enough to cover the worst case scenario, an alarm on each post 10. For a sixteen post 10 fence a 40 kHz data rate is suggested. The sixteen modulation carrier frequencies have to be separated enough to minimize crosstalk, but at the same time, I recommend using the lowest frequencies possible in order to simplify the electronic design and minimize the system cost.

The presence of a CPU 15 in this system makes the addition of built in test equipment (BITE) circuitry very easy. In particular, any non catastrophic malfunction, such as a faulty receiver or a low battery, can be indicated to the surveillance headquarters via the communication channel.

The disclosured security fence requires a battery pack 18 with a long shelf life, a high energy density, and a wide operating temperature range. A primary lithium sulfur dioxide system provides all these characteristics. The battery 18 will be located in the tripod base 24 where its weight will help stabilize the entire post 10.

The post 10 structures are designed to be light, for ease of transport by one man, and sturdy, to resist potential abuse. They are made of welded heavy gage metal sheets and tubes. The post 10 does not need to be concealed and its aspect can be a deterrent.

The tripod base 24 provides the means for leveling the post 10. Only a rough adjustment is necessary since the transmitters 12 and receivers 14 have rotational mounts which can compensate for a few degrees of errors in the perpendicularity of each post 10. The tripod base 24 can be firmly held with spikes driven in the ground. Stability is important, especially if the fence is installed for long periods.

Target applications for the disclosed security fence are border crossings and perimeter intrusion. Border crossing surveillance is particularly important in military peace keeping operations, in such operations, the system's features offer greater reliability convenience and efficiency than typical installation of a wire fence. Perimeter intrusion is also often required in the civilian market for applications such as airport grounds, company facilities or to protect potentially dangerous areas from unauthorized access.

The opto-electronic fence does not preclude the use of a standard hard fence which can be used in conjunction with the opto-electronic fence if added security is required. Main operation advantages of the disclosed opto-electronic fence are: (a) rapid deployment and removal, (b) configuration in multiple 50 m to 1000 m sections, (c) ability to monitor multiple alarms simultaneously, (d) continuous operation in a self-check mode, (e) multiple detection redundancy, and (f) automatic reactivation after detecting an intrusion.

I claim:

1. A post for use in an electromagnetic security fence comprising;
- a plurality of electromagnetic energy beam transmitters;
- a plurality of electromagnetic energy beam receivers;
- a processing unit for modulating the electromagnetic energy beam transmitted from said transmitters for adding information to the beam;
- batteries for providing power for operation;
- means for communicating with a computer at a remote surveillance headquarters;
- a detector for detecting when the electro-magnetic energy beam to a receiver is interrupted; and
- memory means for storing information concerning an interruption in the electromagnetic beam received by one of said receivers when such information cannot be communicated to the computer at the remote surveillance headquarters and for sending the information when the communication is reestablished.

2. A post as claimed in claim 1, further comprising:

a vertical tubular member having said transmitters and said receivers adjustably secured thereto; and a tripod base for supporting said vertical post and housing said processor and said battery.

3. A post as claimed in claim 2, wherein said tripod base includes means for leveling said base and securing said base to the ground.

4. A security fence using a plurality of spaced apart fence posts which can communicate with a surveillance headquarters computer, each post comprising:

a transmitter for sending an electromagnetic beam to an adjacent post;

a receiver for receiving an electromagnetic beam from an adjacent post;

processor means connected to said transmitter and said receiver for modulating the electromagnetic beam sent by said transmitter to add information indicating an interruption in the electromagnetic beam received by said receiver; and, memory means for storing information concerning an interruption in the electromagnetic beam received by said receiver when such information cannot be communicated to the surveillance headquarters computer.

* * * * *